US012131716B1

(12) United States Patent
Lai et al.

(10) Patent No.: US 12,131,716 B1
(45) Date of Patent: Oct. 29, 2024

(54) GATE LINE DRIVER FOR DISPLAY PANEL

(71) Applicant: NOVATEK Microelectronics Corp., Hsinchu (TW)

(72) Inventors: Wei-Jen Lai, Yilan County (TW); Jen-Hao Liao, Hsinchu County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/488,994

(22) Filed: Oct. 17, 2023

(51) Int. Cl.
*G09G 3/36* (2006.01)

(52) U.S. Cl.
CPC ....... *G09G 3/3677* (2013.01); *G09G 2310/08* (2013.01); *G09G 2330/021* (2013.01)

(58) Field of Classification Search
CPC ............. G09G 3/3677; G09G 2310/08; G09G 2330/021
See application file for complete search history.

(56) References Cited

U.S. PATENT DOCUMENTS

2011/0291712 A1* 12/2011 Tobita .................... H03K 5/135 327/144

* cited by examiner

*Primary Examiner* — Stephen G Sherman
(74) *Attorney, Agent, or Firm* — CKC & Partners Co., LLC

(57) ABSTRACT

A gate line driver is provided and includes first to second transistors and first to third switches. The first transistor and the second transistor are coupled in series between a first voltage terminal and a second voltage terminal. The first switch has a first terminal coupled to a first node between the first and second transistors. The second switch has a first terminal coupled to a third voltage terminal and a second terminal coupled to a second terminal of the first switch at a second node. The third switch has a first terminal coupled to the third voltage terminal, a second terminal coupled to the first node, and a third terminal coupled to the second node.

14 Claims, 11 Drawing Sheets

GATE LINE DRIVER FOR DISPLAY PANEL

BACKGROUND

Technical Field

The present disclosure relates to technology related to a gate line driver for a display panel. More particularly, the present disclosure relates to the gate line driver including diode-connected transistor(s) to facilitate generation of gate line signals in the display panel.

Description of Related Art

Thin film transistor (TFT) liquid crystal display (LCD) devices have been widely applied to various information products, such as monitors, laptops, mobile devices, etc. In some approaches, the LCD includes control circuits, such like a timing controller, one or more gate line drivers, one or more source drivers, and a display panel. In operations, the gate line drivers provide gate line signals with pulses to scan lines, which coordinates with the timing controller to turn on or off the TFT gate in sequence and further control the turning on/off of TFTs. However, charging and discharging operations in generation of the pulses in the gate line signal consumes power and induces design complexity of control signals in the gate line drivers.

SUMMARY

Some aspects of the present disclosure are to provide a gate line driver including first to second transistors and first to third switches. The first transistor and the second transistor are coupled in series between a first voltage terminal and a second voltage terminal. The first switch has a first terminal coupled to a first node between the first and second transistors. The second switch has a first terminal coupled to a third voltage terminal and a second terminal coupled to a second terminal of the first switch at a second node. The third switch has a first terminal coupled to the third voltage terminal, a second terminal coupled to the first node, and a third terminal coupled to the second node.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
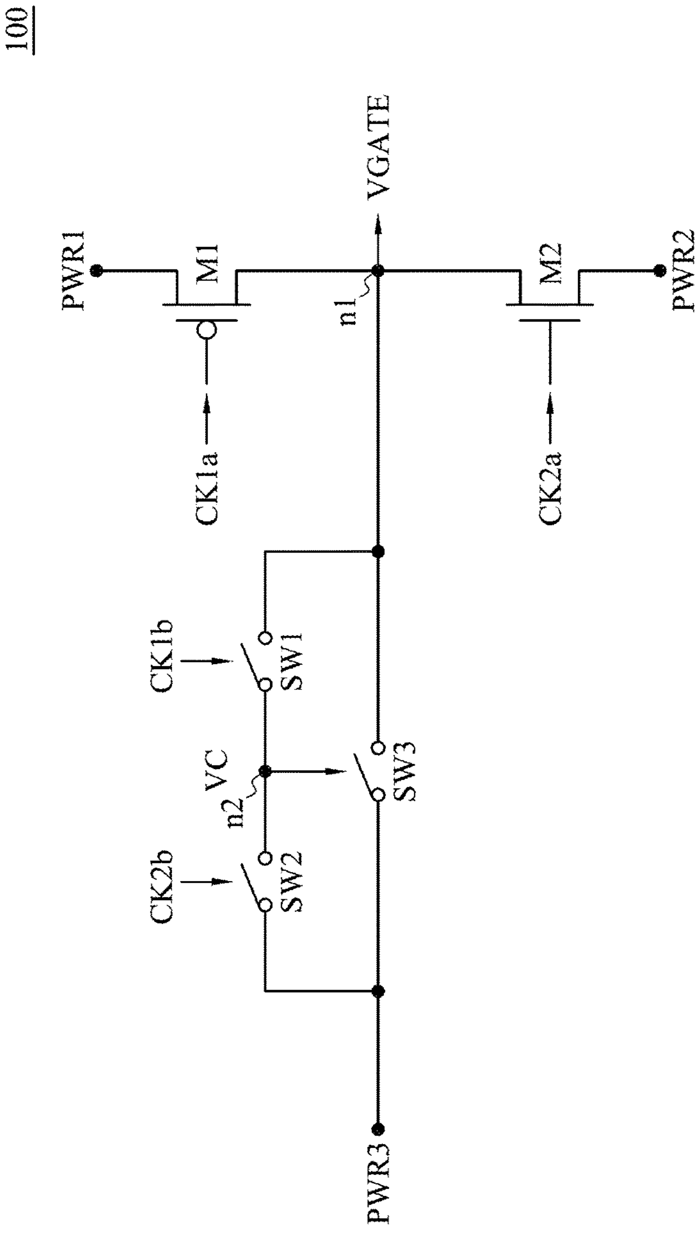
FIG. 1 is a schematic diagram of a gate line driver according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

In the present disclosure, "connected" or "coupled" may refer to "electrically connected" or "electrically coupled." "Connected" or "coupled" may also refer to operations or actions between two or more elements.

In some embodiments, a gate line driver for generating pulses as gate line signals is provided. For example, a pull up circuit, including a PMOS transistor, and a switch are turned on to output a charging current and an auxiliary current for generating rising edges in the pulses, in which the switch is coupled between an output of the gate line signal and a voltage terminal in addition to two supply voltage terminals. For generating falling edges in the pulses, a pull down circuit, including an NMOS and the aforementioned switch are turned on to discharge the node outputting the gate line signal by a discharging current and the auxiliary current that flows to the additional voltage terminal. With the configurations of the present disclosure, the gate line driver consumes less power and operates in faster speed. Accordingly, the performance of the gate line drive is improved.

Reference is now made to FIG. 1. FIG. 1 is a schematic diagram of a gate line driver 100 according to some embodiments of the present disclosure.

For illustration, the gate line driver 100 includes transistors M1-M2 and switches SW1-SW3. The transistor M1 and the transistor M2 are coupled in series between a voltage terminal PWR1 and a voltage terminal PWR2. The switch SW1 has a terminal coupled to a node n1 between the transistors M1-M2 and another terminal coupled to a node n2. The switch SW2 has a terminal coupled to the node n2 and another terminal coupled to a voltage terminal PWR3. The switch SW3 is coupled between the node n1 and the voltage terminal PWR3. Specifically, the switch SW3 has a terminal coupled to one terminal of the switch SW1 at the node n1, another terminal coupled to one terminal of the switch SW2 at the voltage terminal PWR3, and a control terminal coupled to the node 2.

In some embodiments, the transistor M1 is a P-type transistor and the M2 is an N-type transistor. In some embodiments, the transistors M1-M2 are metal-oxide semiconductor (MOS) transistors.

In some embodiments, the transistors M1-M2 and the switches SW1-SW3 are configured to cooperate to generate a gate line signal VGATE at the node n1 according to voltages at the voltage terminals PWR1-PWR3. In some embodiments, a voltage $V_{PWR3}$ at the voltage terminal PWR3 is between the voltage $V_{PWR1}$ at the voltage terminal PWR1 and the voltage $V_{PWR2}$ at the voltage terminal PWR2, and the voltage $V_{PWR1}$ is greater than the voltage $V_{PWR2}$. In some embodiments, the voltage $V_{PWR1}$ is a positive voltage, the voltage $V_{PWR2}$ is a negative voltage, and the voltage $V_{PWR3}$ is grounded (i.e., zero volts).

Specifically, the transistors M1-M2 operates in response to control signals CK1*a* and CK2*a* respectively. The switches SW1-SW2 operates in response to control signals CK1*b* and CK2*b* respectively, and the switch SW3 is controlled by a voltage VC of the node n2 in response to the operations of the switches SW1-SW2. In some embodiments, the control signal CK1*b* is a coupling signal of the control signal CK1*a*, and the switch SW1 is switched correspondingly to the transistor M1 being switched. The control signal CK2*b* is a coupling signal of the control signal CK2*a*, and the switch SW2 is switched correspondingly to the transistor M2 being switched.

For example, when the transistor M2 and the switch SW2 are turned off, the transistor M1 and the switch SW1 are turned on and the node n1 is electrically connected to the voltage terminal PWR3 through the switch SW3 that is turned on in response to the voltage VC and diode-connected. Similarly, when the transistor M1 and the switch SW1 are turned off, the transistor M2 and the switch SW2 are turned on and the node n1 is electrically connected to the voltage terminal PWR3 through the switch SW3.

Figure 2:
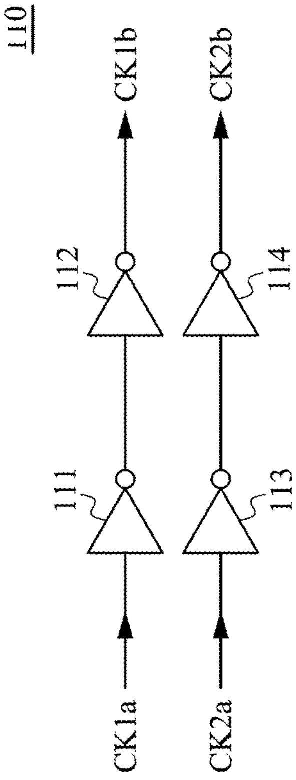
FIG. 2 is a schematic diagram of a signal generator according to some embodiments of the present disclosure.

Reference is now made to FIG. 2. FIG. 2 is a schematic diagram of a signal generator 110 according to some embodiments of the present disclosure. In some embodiments, the signal generator 110 is configured to generate the control signals CK1*b* and CK2*b* according to the control signals CK1*a* and CK2*a*. The control signals CK1*b* and CK2*b* are different from the control signals CK1*a* and CK2*a*. For example, the control signals CK1*b* and CK2*b* are delayed signals with respect to the control signals CK1*a* and CK2*a*, and include latency and/or phase differences.

As illustratively shown in FIG. 2, the signal generator 110 includes inverters 111-114. The inverter 111 receives the control signal CK1*a* and outputs the inverted signal to the inverter 112, and the inverter 112 inverts the received signal to generate the control signal CK1*b*. Similarly, the inverter 113 receives the control signal CK2*a* and outputs the inverted signal to the inverter 114, and the inverter 114 inverts the received signal to generate the control signal CK2*b*.

The configurations of FIGS. 1-2 are given for illustrative purposes. Various implements are within the contemplated scope of the present disclosure. For example, in some embodiments, the control signals CK1*b* and CK2*b* are not generated by the signal generator 110 and generated by any other suitable circuit of outputting coupling signals.

Figure 3:
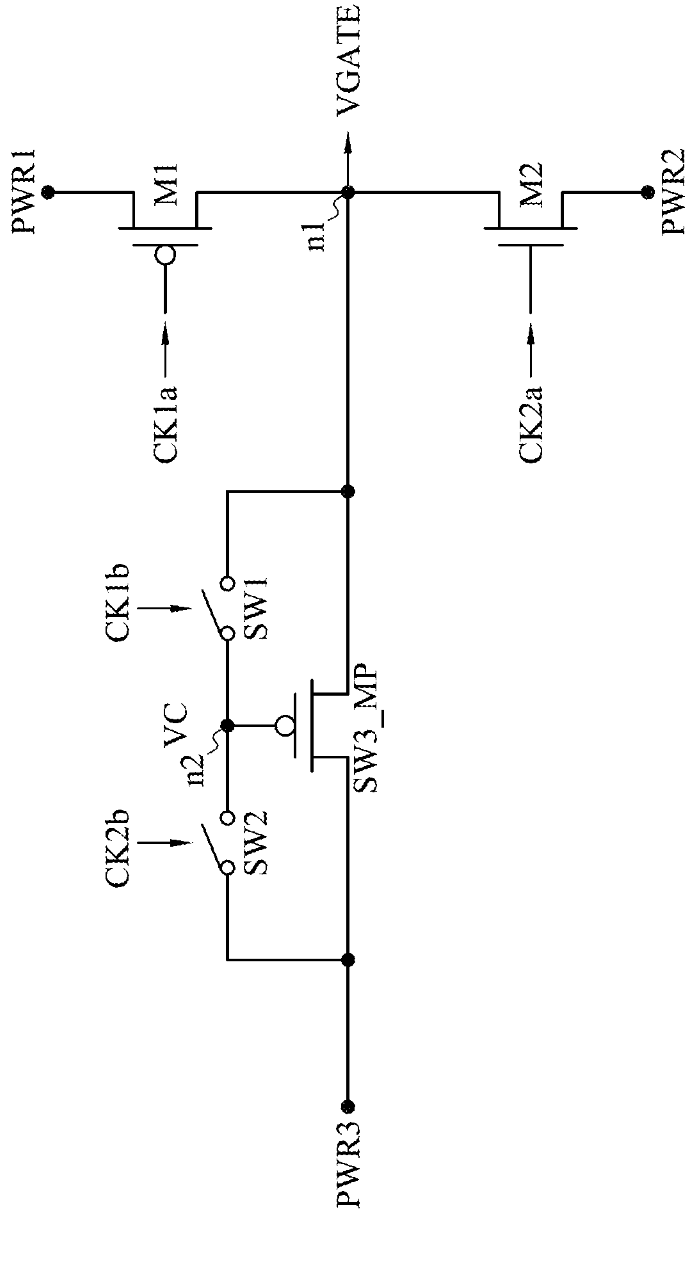
FIG. 3 is a schematic diagram of a gate line driver according to some embodiments of the present disclosure.

Reference is now made to FIG. 3. FIG. 3 is a schematic diagram of a gate line driver 300 according to some embodiments of the present disclosure. With respect to the embodiments of FIGS. 1-2, like elements in the following figures are designated with the same reference numbers for ease of understanding. The specific operations of similar elements, which are already discussed in detail in above paragraphs, are omitted herein for the sake of brevity.

Compared with the embodiments in FIG. 1, the switch SW3 is implemented by a P-type metal-oxide semiconductor (PMOS) transistor SW3_MP and has a gate terminal coupled to the node n2, a drain/source terminal coupled to the node n1 and a source/drain terminal coupled to the voltage terminal PWR3.

Figure 4A:
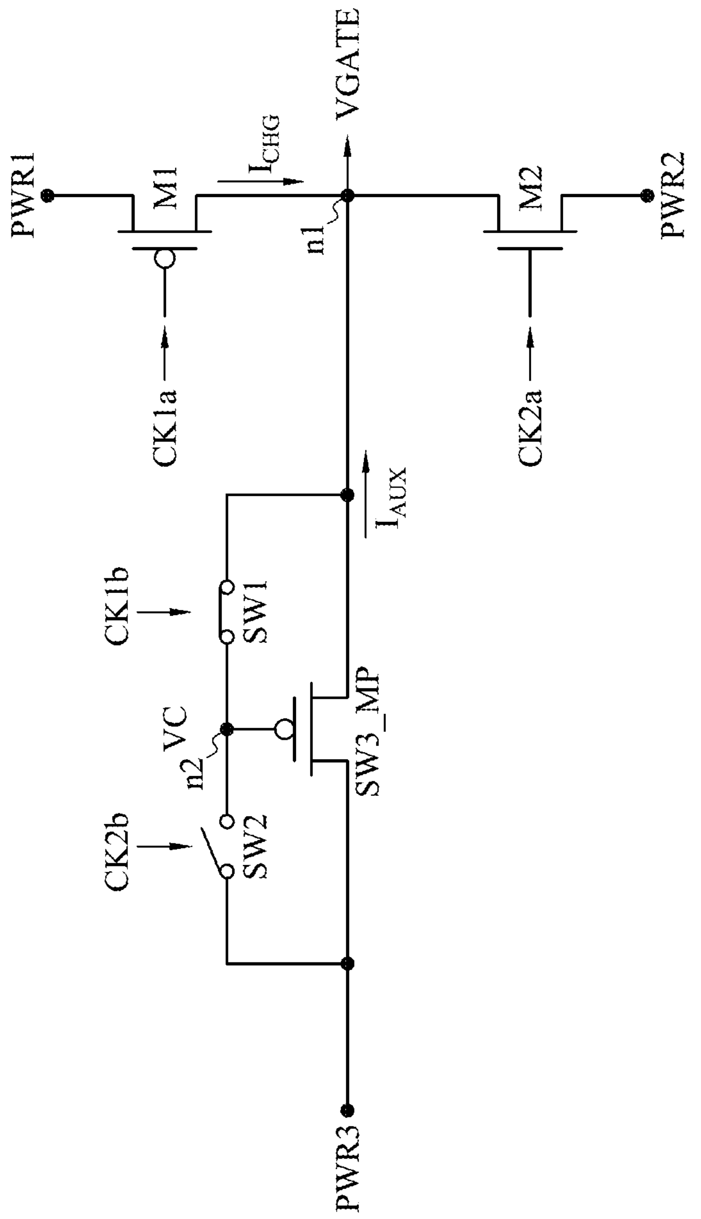
FIGS. 4A and 4B illustrate schematic diagrams of the gate line driver of FIG. 3 in operation, in accordance with to some embodiments of the present disclosure.
Figure 4C:
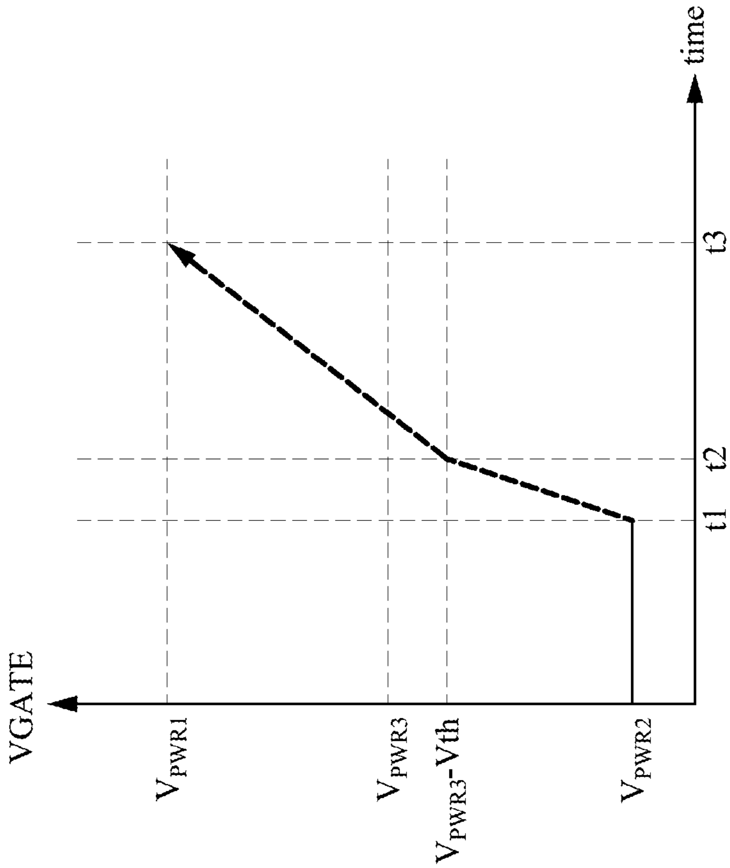
FIG. 4C is a schematic waveform diagram of a gate line signal output by the gate line driver of FIG. 3, according to some embodiments of the present disclosure.
Figure 4B:
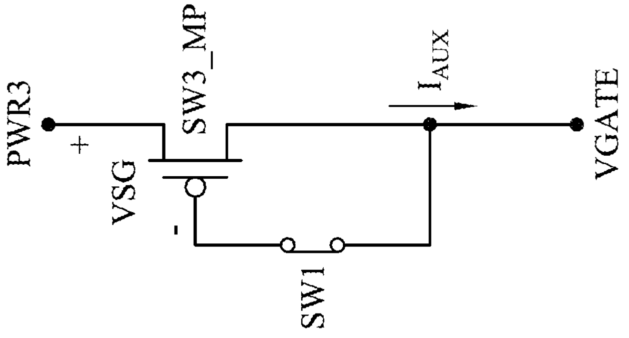

Reference is now made to FIGS. 4A, 4B and 4C. FIGS. 4A and 4B illustrate schematic diagrams of the gate line driver 300 of FIG. 3 in a charging operation, and FIG. 4C is a schematic waveform diagram of the gate line signal VGATE output by the gate line driver 300, according to some embodiments of the present disclosure.

In some embodiments, during the charging operation, the transistor M2 is turned off in response to the control signal CK2*a* having a low logic state and the transistor M1 is turned on in response to the control signal CK1*a* having the low logic state to charge the node n1 based on the voltage $V_{PWR1}$ by a charging current $I_{CHG}$ flowing from the voltage terminal PWR1 to the node n1.

The switch SW1 is turned on correspondingly in response to the control signal CK1*b* to couple the node n1 to the node n2 while the switch SW2 is off. Accordingly, as shown in FIG. 4B, the transistor SW3_MP is diode-connected as the gate terminal and the drain/source terminal thereof are connected to each other through the switch SW1.

With reference to FIGS. 4B and 4C, at the beginning of the charging operation, the gate line signal VGATE has the voltage $V_{PWR2}$ smaller than the voltage $V_{PWR3}$, and a voltage VSG across the gate terminal and the drain/source terminal of the transistor SW3_MP is greater than a threshold voltage Vth of the transistor SW3_MP. Accordingly, the transistor SW3_MP is turned on to generate an auxiliary current $I_{AUX}$ to the node n1 to charge the gate line signal VGATE.

As shown in FIG. 4C, at time t1, the gate line signal VGATE at the node n1 increases as the charging current $I_{CHG}$ generated by the transistor M1 and the auxiliary current $I_{AUX}$ generated by the transistor SW3_MP flow to and charge the node n1.

During time t1 to time t2, the gate line signal VGATE is charged to have a voltage level equal to $V_{PWR3}$-Vth while the auxiliary current $I_{AUX}$ decreases. At time t2, a voltage difference, i.e., the voltage VSG of the transistor SW3_MP, between the voltage $V_{PWR3}$ and the gate line signal VGATE is smaller the threshold voltage Vth of the transistor SW3_MP. Accordingly, the transistor SW3_MP is turned off and the auxiliary current $I_{AUX}$ equals to zero. The node n1 is charged by the charging current $I_{CHG}$ fully and the gate line signal VGATE increases with a milder slope, compared with that between time t1 and time t2.

At time t3, the voltage level of the gate line signal VGATE is pulled up to the voltage $V_{PWR1}$, and the charging operation is complete.

In some approaches, a rising edge of a pulse in a gate line signal is merely generated by one charge current from a positive voltage terminal, which causes high power consumption. With the configurations of the present disclosure, an additional charging current is provided by the voltage terminal PWR3 for charging, which reduces power usage of the voltage terminal PWR1. Furthermore, when the voltage terminal PWR3 is grounded, no extra power is necessary for generating the auxiliary current $I_{AUX}$. Alternatively stated, total energy consumption of the charging operation decreases. By benefitting from the additional charging capability of the gate line driver 300, the time of charging operation is shortened, and therefore performance of the gate line driver 300 improves.

Moreover, comparing with some other approaching implementing multiple logic signals for controlling auxiliary circuits in charging operation, the present disclosure utilizes a diode-connected transistor to spontaneously turn on or off for generating the auxiliary current $I_{AUX}$, accompanying the control of two switches in response to the control signals CK1*b* and CK2*b*. Due to the fact that the control signals CK1*b* and CK2*b* are coupling signals of the original control signals CK1*a* and CK2*a*, it cuts the number of control signals and simplifies configurations of auxiliary circuit.

Figure 5A:
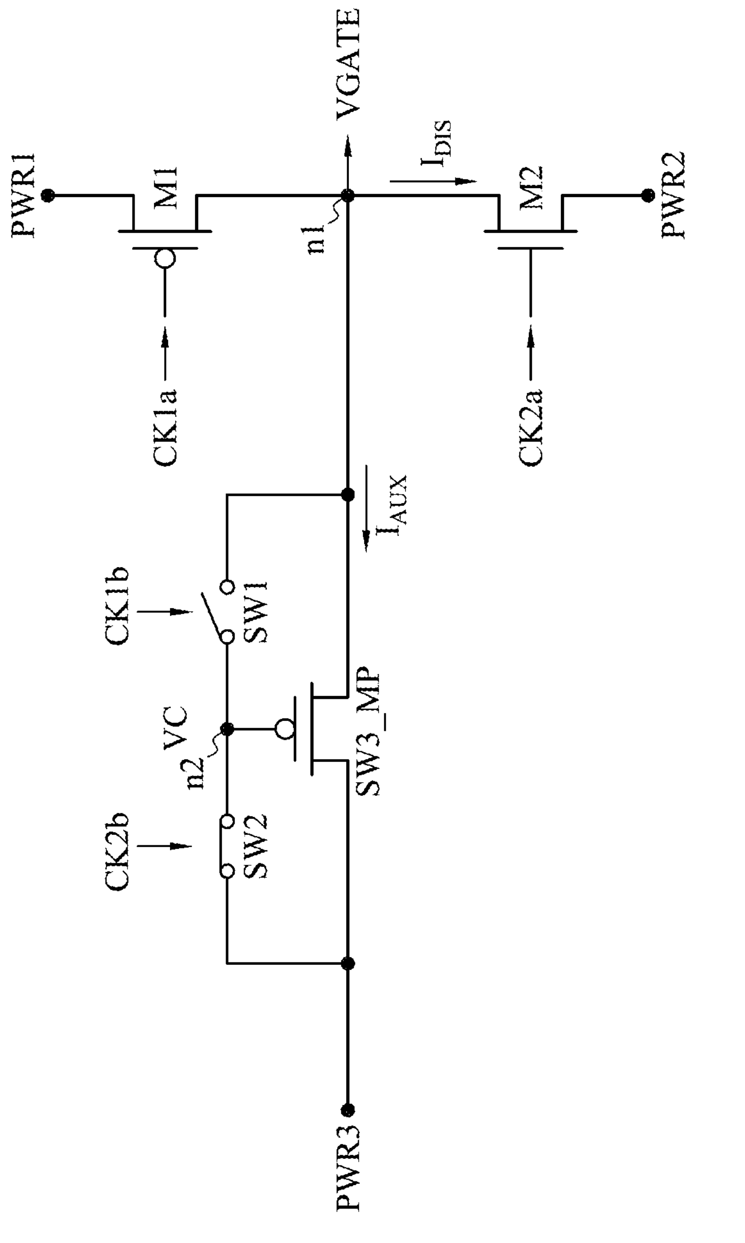
FIGS. 5A and 5B illustrate schematic diagrams of the gate line driver of FIG. 3 in operation, in accordance with to some embodiments of the present disclosure.
Figure 5B:
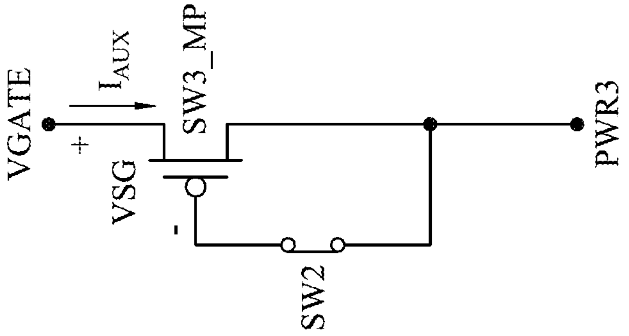
Figure 5C:
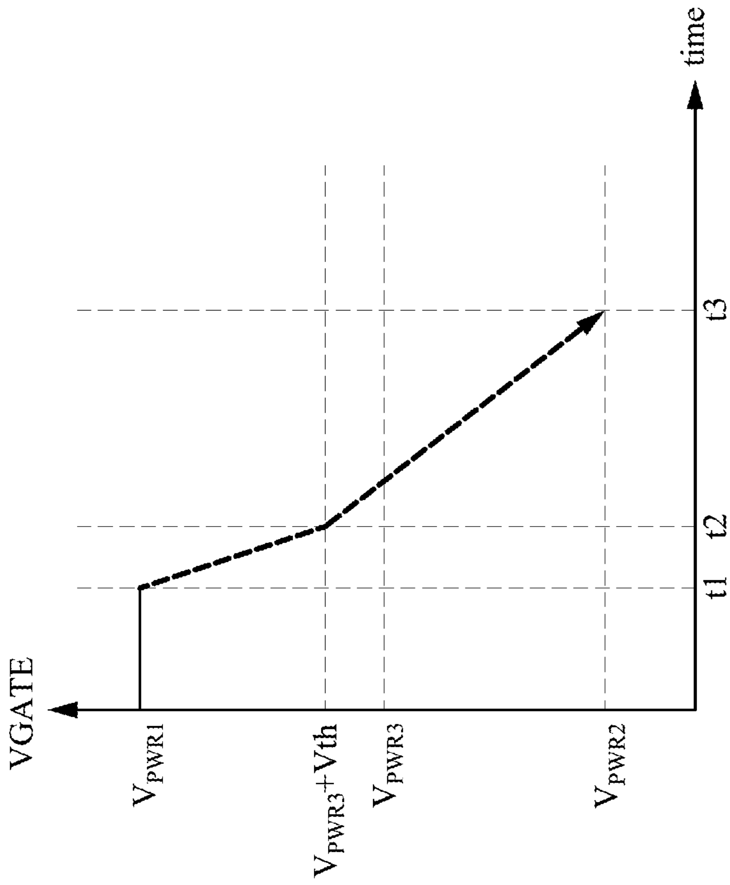
FIG. 5C is a schematic waveform diagram of a gate line signal output by the gate line driver of FIG. 3, according to some embodiments of the present disclosure.

For a discharging operation of the gate line driver 300, reference is now made to FIGS. 5A, 5B and 5C. FIGS. 5A and 5B illustrate schematic diagrams of the gate line driver 300 of FIG. 3, and FIG. 5C is a schematic waveform diagram of the gate line signal VGATE, according to some embodiments of the present disclosure.

In some embodiments, during the discharging operation, the transistor M1 is turned off in response to the control signal CK1*a* having a high logic state and the transistor M2 is turned on in response to the control signal CK2*a* having the high logic state to discharge the node n1 based on the voltage $V_{PWR2}$ by a discharging current $I_{DIS}$ flowing from the node n1 to the voltage terminal PWR2.

The switch SW2 is turned on correspondingly in response to the control signal CK2*b* to couple the node n2 to the voltage terminal PWR3 while the switch SW1 is off. Accordingly, as shown in FIG. 5B, the transistor SW3_MP is diode-connected as the gate terminal and the source/drain terminal thereof are connected to each other through the switch SW2.

With reference to FIGS. 5B and 5C, at the beginning of the discharging operation, the gate line signal VGATE has the voltage $V_{PWR1}$ greater than the voltage $V_{PWR3}$, and the voltage VSG across the gate terminal and the source/drain terminal of the transistor SW3_MP is greater than the threshold voltage Vth of the transistor SW3_MP. Accordingly, the transistor SW3_MP is turned on to generate the auxiliary current $I_{AUX}$ to the voltage terminal PWR3 to discharge the gate line signal VGATE.

As shown in FIG. 5C, at time t1, the gate line signal VGATE at the node n1 decreases by a large slope as voltage at the node n1 is pulled down by the transistor M2 generating the discharging current $I_{DIS}$ and the diode-connected transistor SW3_MP generating the auxiliary current $I_{AUX}$.

During time t1 to time t2, the gate line signal VGATE is discharged to have a voltage level equal to $V_{PWR3}$+Vth while the auxiliary current $I_{AUX}$ decreases. At time t2, the voltage difference between the voltage $V_{PWR3}$ and the gate line signal VGATE is smaller the threshold voltage Vth of the transistor SW3_MP. Accordingly, the transistor SW3_MP is turned off and the auxiliary current $I_{AUX}$ equals to zero. The node n1 is discharged by the discharging current $I_{DIS}$ fully and the gate line signal VGATE decreases with a milder slope, compared with that between time t1 and time t2.

At time t3, the voltage level of the gate line signal VGATE is pulled down to the voltage $V_{PWR2}$, and the discharging operation is complete.

Similarly to the charging operation, in some approaches, a falling edge of a pulse in a gate line signal is merely generated by one discharge current from a negative voltage terminal, which causes high power consumption. With the configurations of the present disclosure, an additional discharging current is provided by the voltage terminal PWR3 for discharging, which reduces power usage of the voltage terminal PWR2 and no extra power is necessary for generating the auxiliary current $I_{AUX}$. Alternatively stated, total energy consumption of the discharging operation decreases. By benefitting from the additional discharging capability of the gate line driver 300, the time of discharging operation is shortened, and therefore performance of the gate line driver 300 improves.

Figure 6:
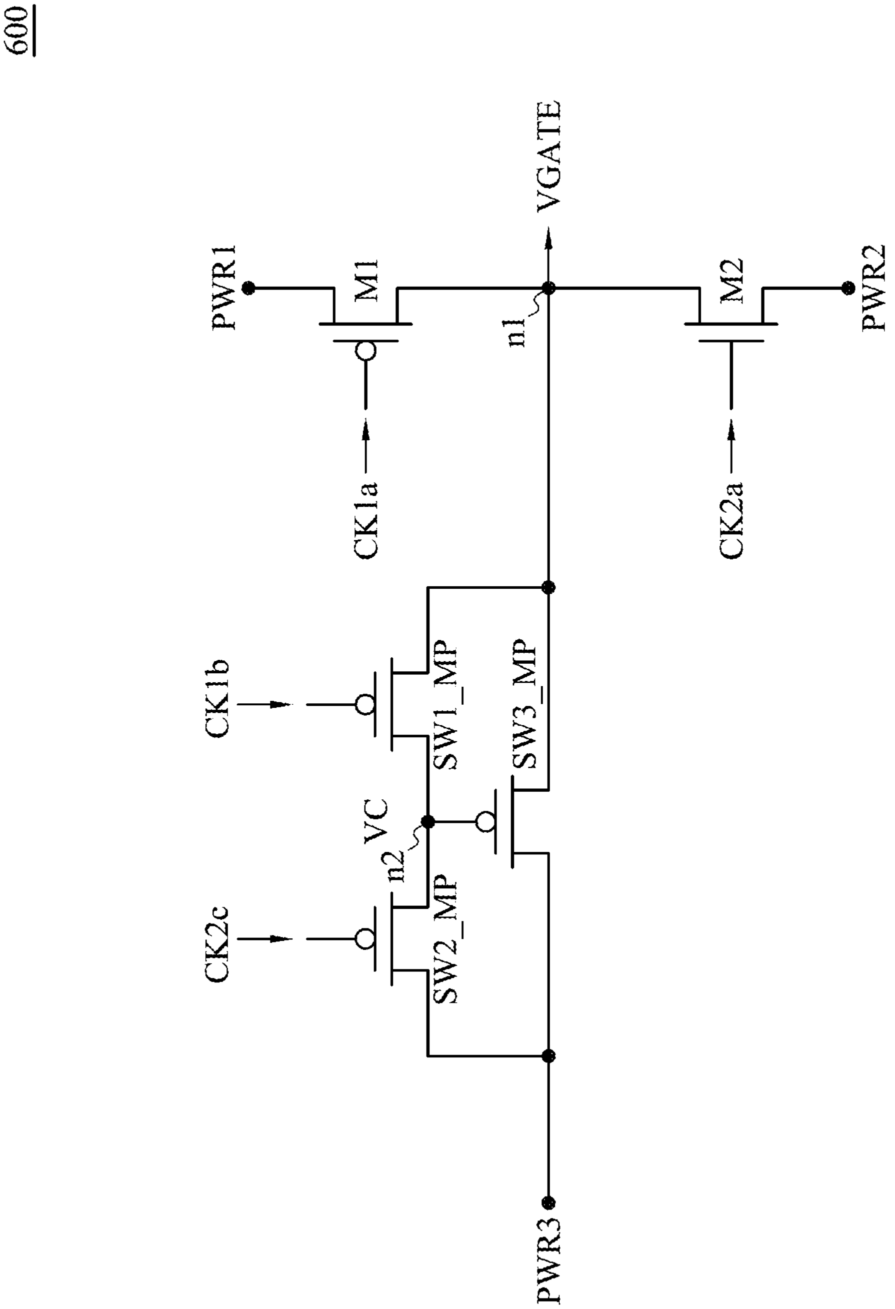
FIG. 6 is a schematic diagram of a gate line driver according to another embodiment of the present disclosure.

Reference is now made to FIG. 6. FIG. 6 is a schematic diagram of a gate line driver 600 according to another embodiment of the present disclosure.

Comparing with the embodiments of FIG. 3, the switches SW1-SW2 are implemented by two PMOS transistors SW1_MP and SW2_MP in the gate line driver 600 in FIG. 6. In some embodiments, the transistor SW2_MP is configured to operate in response to a control signal CK2*c* which has a logic state different from the control signal CK2*a*. In some embodiments, the control signal CK2*c* is generated by the inverter 113 in FIG. 2 in response to the control signal CK2*a*.

Figure 7:
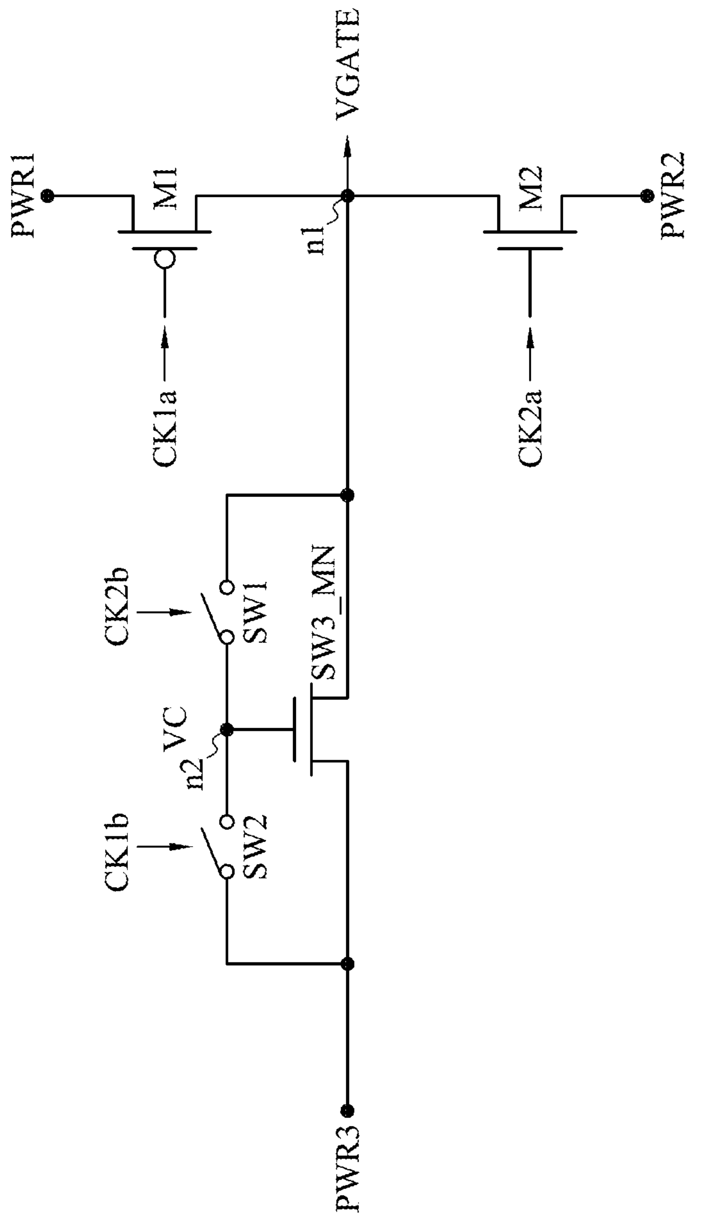
FIG. 7 is a schematic diagram of a gate line driver according to another embodiment of the present disclosure.

Reference is now made to FIG. 7. FIG. 7 is a schematic diagram of a gate line driver 700 according to another embodiment of the present disclosure.

Comparing with the embodiments of FIG. 3, the transistor SW3_MP is implemented by an NMOS transistor SW3_MN in the gate line driver 700 in FIG. 7. As shown in FIG. 7, instead of operating in response to the control signal CK1*b*, the switch SW1 is controlled by the control signal CK2*b*. Instead of operating in response to the control signal CK2*b*, the switch SW2 is controlled by the control signal CK1*b*.

In the charging operation, according to some embodiments, the transistor M1 is turned on to provide the charging current $I_{CHG}$ to the node n1, and the switch SW2 is turned on to couple the voltage terminal PWR3 to the node n2 when the switch SW1 is off. The transistor SW3_MN is accordingly diode-connected and provides the auxiliary current $I_{AUX}$ to the node n1 to charge the gate line signal VGATE from having the voltage $V_{PWR2}$ to the voltage $V_{PWR1}$.

In the discharging operation, according to some embodiments, the transistor M2 is turned on to make the discharging current $I_{DIS}$ flow from the node n1 to the voltage terminal PWR2. When the switch SW2 is off, the switch SW1 is turned on to couple the node n1 to the node n2. The transistor SW3_MN is accordingly diode-connected and discharges the node n1 by the auxiliary current $I_{AUX}$ to the voltage terminal PWR3. The gate line signal VGATE is pulled to the voltage $V_{PWR2}$ by the auxiliary current $I_{AUX}$ and the discharging current $I_{DIS}$.

Figure 8:
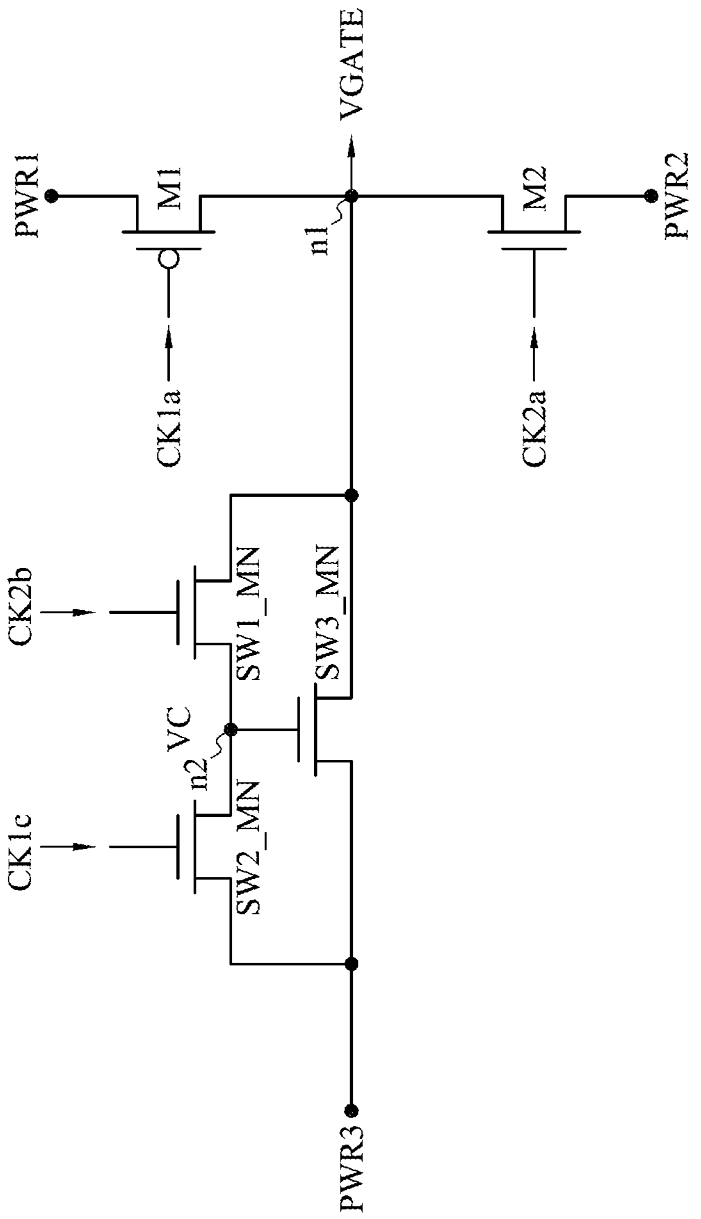
FIG. 8 is a schematic diagram of a gate line driver according to another embodiment of the present disclosure.

Reference is now made to FIG. 8. FIG. 8 is a schematic diagram of a gate line driver 800 according to another embodiment of the present disclosure.

Comparing with the embodiments of FIG. 7, the switches SW1-SW2 are implemented by two NMOS transistors SW1_MN and SW2_MN in the gate line driver 800 in FIG. 8. In some embodiments, the transistor SW2_MN is configured to operate in response to a control signal CK1*c* which has a logic state different from the control signal CK1*a*. In some embodiments, the control signal CK1*c* is generated by the inverter 111 in FIG. 2 in response to the control signal CK1*a*.

Figure 9:
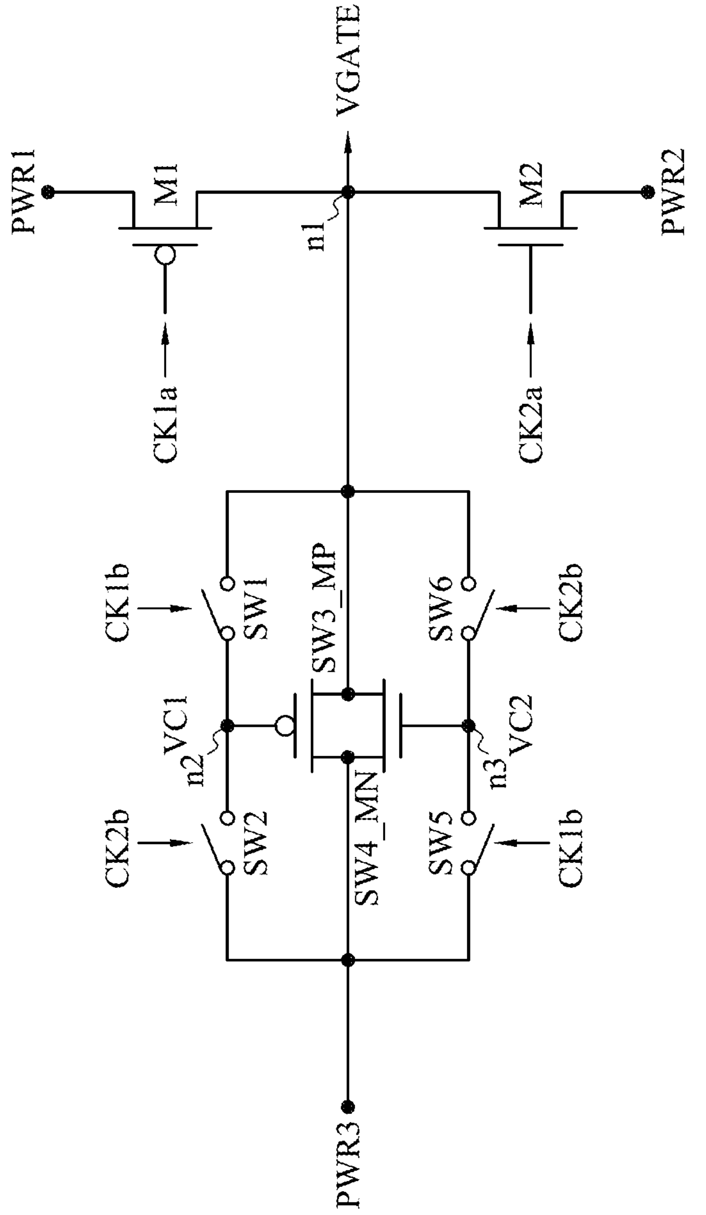
FIG. 9 is a schematic diagram of a gate line driver according to another embodiment of the present disclosure.

Reference is now made to FIG. 9. FIG. 9 is a schematic diagram of a gate line driver 900 according to another embodiment of the present disclosure.

Comparing with the embodiments of FIG. 3, the gate line driver 900 further includes switches SW5-SW6 and an NMOS transistor SW4_MN to form a complementary MOS with the PMOS transistor SW3_MP. Specifically, as shown in FIG. 9, the transistor SW4_MN has a gate terminal coupled to a node n3 and drain and source terminals that are coupled to the voltage terminal PWR3 and the node n1 respectively. The node n3 is between the switches SW5-SW6. The switch SW5 has a terminal coupled to the voltage terminal PWR3 and another terminal coupled to one terminal of the switch SW6 at the node n3. Another terminal of the switch SW6 is coupled to the node n1.

In some embodiments, the switch SW5 is configured to operate in response to the control signal CK1*b*, and the switch SW6 is configured to operate in response to the control signal CK2*b*.

In the charging operation, according to some embodiments, the transistors SW3_MP and SW4_MN are turned on to be diode-connected in response to the turning on switches SW1 and SW5. The voltage VC1 at the node n2 initially equals to the voltage of the gate line signal VGATE (for example, equal the voltage $V_{PWR2}$,) the voltage VC2 at the node n3 initially equals to the voltage $V_{PWR3}$. Accordingly, the auxiliary current $I_{AUX}$ is generated by the transistors SW3_MP and SW4_MN to flow to the node n1 from the voltage terminal PWR3 for charging.

In the discharging operation, according to some embodiments, the transistors SW3_MP and SW4_MN are turned on to be diode-connected in response to the turning on switches SW2 and SW6. The voltage VC1 initially equals to the voltage of the voltage $V_{PWR3}$, and the voltage VC2 initially equals to gate line signal VGATE (for example, equal the voltage $V_{PWR1}$.) Accordingly, the auxiliary current $I_{AUX}$ is generated by the transistors SW3_MP and SW4_MN to flow to the voltage terminal PWR3 from the node n1 for discharging.

Figure 10:
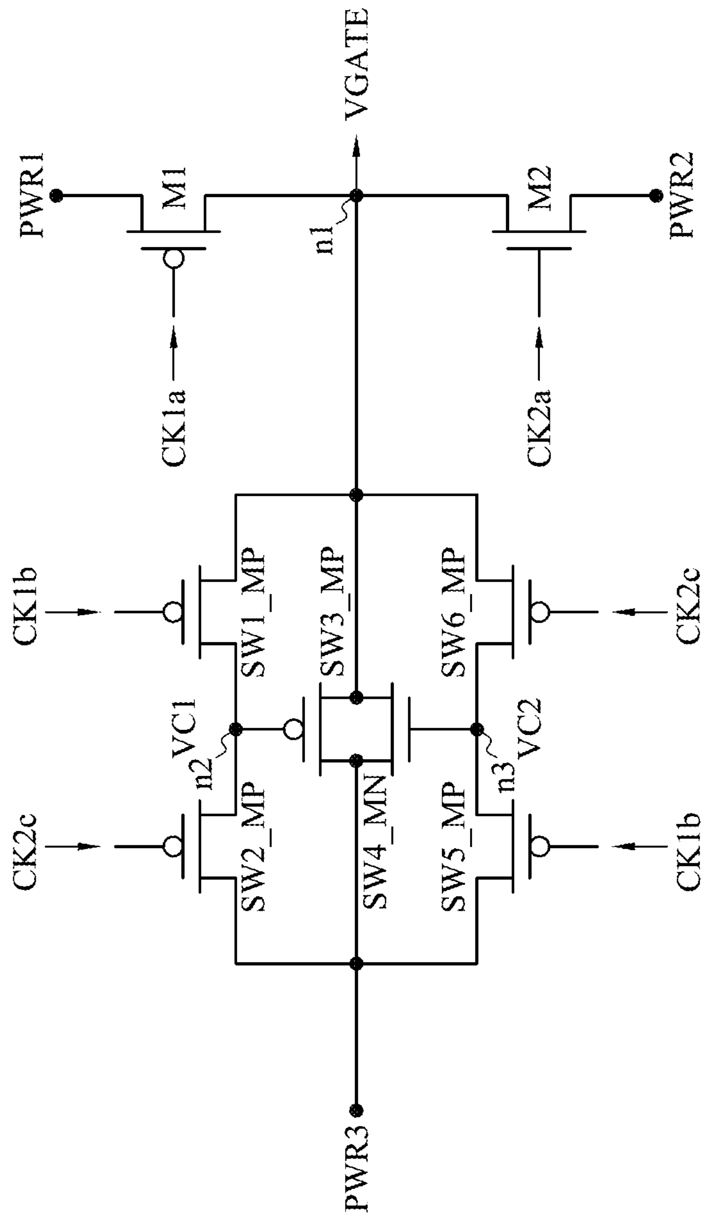
FIG. 10 is a schematic diagram of a gate line driver according to another embodiment of the present disclosure.

Reference is now made to FIG. 10. FIG. 10 is a schematic diagram of a gate line driver 1000 according to another embodiment of the present disclosure.

Comparing with the embodiments of FIG. 9, the switches SW1-SW2 and SW5-SW6 are implemented by four PMOS transistors SW1_MP, SW2_MP, SW5_MP and SW6_MP in the gate line driver 1000 in FIG. 10. In some embodiments, the transistors SW2_MP and SW6_MP are configured to operate in response to the control signal CK2*c*.

As described above, in the present disclosure, the gate line driver utilizes a switch that is coupled between an output of the gate line signal and a voltage terminal additional to two positive and negative supply voltage terminals in the gate line driver, for providing auxiliary charging current and discharging current in generating the gate line signal. In such configuration, less power consumption of the positive and negative supply voltage terminals and improved operational speed in charging and discharging operations are provided. Moreover, due to the characteristics of diode connection of transistor(s) that implement the switch, fewer control signals are needed, reducing design complexity of control signals in the gate line driver.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A gate line driver, comprising:

a first transistor and a second transistor coupled in series between a first voltage terminal and a second voltage terminal;

a first switch having a first terminal coupled to a first node between the first and second transistors;

a second switch having a first terminal, coupled to a third voltage terminal that is different from the first voltage terminal and the second voltage terminal, and a second terminal coupled to a second terminal of the first switch at a second node;

a third switch having a first terminal coupled to the third voltage terminal, a second terminal coupled to the first node, and a third terminal coupled to the second node, wherein the first transistor, the second switch, the third switch are P-type transistors, and the second transistor is an N-type transistor;

a third transistor of N-type having first and second terminals that are coupled to the first and second terminals of the third switch respectively; and fourth and fifth transistors of P-type that are coupled between the first node and the third voltage terminal, wherein a gate terminal of the third transistor is coupled to a third node between the fourth and fifth transistors.

2. The gate line driver of claim 1, wherein the third switch is a metal-oxide semiconductor (MOS) transistor, and the third terminal of the third switch is a gate terminal.

3. The gate line driver of claim 2, wherein the first and second switches are MOS transistors, and the second terminals of the first and second switches are drain/source terminals.

4. The gate line driver of claim 1, wherein the first switch is a P-type transistor, wherein the first terminals of the first to third switches are drain/source terminals, the second terminals of the first to third switches are source/drain terminals, and the third terminal of the third switch is a gate terminal.

5. The gate line driver of claim 1, wherein a voltage at the third voltage terminal is between voltages at the first and second voltage terminals.

6. The gate line driver of claim 1, wherein when the second transistor and the second switch are turned off, the first transistor and the first switch are configured to be turned on and the first node is electrically connected to the third voltage terminal through the diode-connected third switch.

7. The gate line driver of claim 6, wherein when the first transistor and the first switch are turned off, the second transistor and the second switch are configured to be turned on and the first and second terminals of the third switch are electrically connected to each other.

8. A gate line driver, comprising:

a first transistor and a second transistor coupled in series between a first voltage terminal and a second voltage terminal;

a first switch having a first terminal coupled to a first node between the first and second transistors;

a second switch having a first terminal, coupled to a third voltage terminal that is different from the first voltage terminal and the second voltage terminal, and a second terminal coupled to a second terminal of the first switch at a second node; and a third switch having a first terminal coupled to the third voltage terminal, a second terminal coupled to the first node, and a third terminal coupled to the second node, wherein when the second transistor and the second switch are turned off, the first transistor and the first switch are configured to be turned on and the first node is electrically connected to the third voltage terminal through the diode-connected third switch.

9. The gate line driver of claim 8, wherein when the first transistor and the first switch are turned off, the second transistor and the second switch are configured to be turned on and the first and second terminals of the third switch are electrically connected to each other.

10. The gate line driver of claim 8, wherein the first transistor and the third switch are P-type transistors, and the second transistor is an N-type transistor, wherein the gate line driver further comprises:

a third transistor of N-type having first and second terminals that are coupled to the first node and the third voltage terminal respectively;

a fourth switch having a first terminal coupled to the third voltage terminal and a second terminal coupled to a gate terminal of the third transistor at a third node; and a fifth switch having a first terminal coupled to the first node and a second terminal coupled to the third node.

11. The gate line driver of claim 10, wherein the fourth switch and the fifth switch are P-type transistors.

12. The gate line driver of claim 8, wherein the first transistor is a P-type transistors, and the second transistor and the third switch are N-type transistors.

13. The gate line driver of claim 8, wherein the third switch is an N-type metal-oxide semiconductor (NMOS) transistor, and the third terminal of the third switch is a gate terminal.

14. The gate line driver of claim 13, wherein the first and second switches are NMOS transistors, and the second terminals of the first and second switches are drain/source terminals.

* * * * *